United States Patent
Arnold et al.

(10) Patent No.: US 9,907,289 B2
(45) Date of Patent: Mar. 6, 2018

(54) BIDIRECTIONAL SPRING-BIASED GATE

(71) Applicants: Chad Arnold, Belfast, TN (US);
Robyn Arnold, Belfast, TN (US)

(72) Inventors: Chad Arnold, Belfast, TN (US);
Robyn Arnold, Belfast, TN (US)

(*) Notice: Subject to any disclaimer, the term of this patent is extended or adjusted under 35 U.S.C. 154(b) by 0 days.

(21) Appl. No.: 14/541,100

(22) Filed: Nov. 13, 2014

(65) Prior Publication Data

US 2015/0167383 A1 Jun. 18, 2015

Related U.S. Application Data

(60) Provisional application No. 61/903,661, filed on Nov. 13, 2013.

(51) Int. Cl.

| | |
|---|---|
| *A01K 1/00* | (2006.01) |
| *E04H 17/16* | (2006.01) |
| *A01K 3/00* | (2006.01) |
| *E06B 11/02* | (2006.01) |

(52) U.S. Cl.
CPC .......... *A01K 1/0017* (2013.01); *A01K 3/002* (2013.01); *E04H 17/16* (2013.01); *E06B 11/027* (2013.01)

(58) Field of Classification Search
CPC ........ E06B 11/026; E06B 11/02; E04H 17/16; A01K 1/0017
USPC ...................................... 49/131, 49
See application file for complete search history.

(56) References Cited

U.S. PATENT DOCUMENTS

| 772,417 A | 10/1904 | Kidd | |
|---|---|---|---|
| 1,499,120 A * | 6/1924 | Nies | E06B 11/02 49/131 |
| 2,044,658 A * | 6/1936 | Lewis | 49/131 |
| 2,585,481 A | 2/1952 | Martin | |
| 2,592,736 A * | 4/1952 | Puckett | 49/131 |
| 2,629,191 A | 2/1953 | Koch et al. | |
| 2,786,289 A | 3/1957 | Koch | |
| 3,022,590 A * | 2/1962 | Ohlhausen | 49/58 |
| 3,089,267 A * | 5/1963 | Wooden | 49/131 |
| 3,170,258 A * | 2/1965 | Ohlhausen | 49/131 |
| 3,296,741 A * | 1/1967 | Lubmann | 49/131 |
| 3,299,572 A * | 1/1967 | Wallace | 49/131 |
| 3,854,243 A * | 12/1974 | Walker | 49/131 |
| 3,854,244 A * | 12/1974 | Walker | E06B 11/02 49/131 |
| 5,282,336 A | 2/1994 | Tucker | |
| 2006/0226406 A1* | 10/2006 | Vise et al. | 256/19 |

(Continued)

*Primary Examiner* — Gregory J Strimbu
(74) *Attorney, Agent, or Firm* — Tod A. Kupstas

(57) ABSTRACT

A bidirectional, spring-biased gate assembly includes a pair of side frames, an elongated hinge extending therebetween, and a gate extending vertically from the hinge. In a resting position, the gate extends vertically across an open interior between the pair of side frames, providing a movable barrier suitable for deterring and/or blocking animals from passing therethrough. The gate is able to transition between the resting position, a first lowered position perpendicular to the resting position, and a second lowered position perpendicular to the resting position in the opposite direction of the first lowered position. The gate assembly further comprises a plurality of springs extending between one of the side frames and the gate and are adapted to return the gate to the resting position from either the first lowered position or the second lowered position.

6 Claims, 3 Drawing Sheets

(56) References Cited

U.S. PATENT DOCUMENTS

2012/0279146 A1\* 11/2012 Thomas .................. E06B 11/02
                                                                                     52/126.1

\* cited by examiner

BIDIRECTIONAL SPRING-BIASED GATE

CROSS REFERENCE TO RELATED APPLICATION

This application claims the benefit of U.S. Provisional Application No. 61/903,661 filed on Nov. 13, 2013. The above identified patent application is herein incorporated by reference in its entirety to provide continuity of disclosure.

BACKGROUND OF THE INVENTION

Field of the Invention

The present invention relates to gates. More specifically, the present invention relates to gates for use with animal enclosures. Even more specifically, the present event relates to drive-through gates that are adapted to automatically return to their position acting as a barrier after an individual has passed therethrough.

Description of the Prior Art

Devices have been disclosed in the prior art that relate to drive-through gates. These include devices that have been patented and published in patent application publications. These devices generally relate to gates having a motion detection mechanism for determining when to open or close the gate or a physical sensor to physically detect the presence of a vehicle or person seeking to pass therethrough, i.e. bump gates. These prior art devices have several known drawbacks, however. These types of drive-through gates generally have a delay in the time between when the individual or vehicle passes therethrough and when the vehicle closes because these gates are time-based and thus designed to only close after a certain period of time. This is a disadvantageous design because even a slight delay provides animals with an enclosure with the opportunity to escape therethrough.

The present invention provides a bidirectional drive-through gate that is adapted to automatically return to its resting upstanding position, without a delay, once an individual on a vehicle, such as an ATV or UTV, has passed therethough. The present invention substantially diverges in design elements from the prior art and consequently it is clear that there is a need in the art for an improvement to existing drive-through gate devices. In this regard the instant invention substantially fulfills these needs.

SUMMARY OF THE INVENTION

In view of the foregoing disadvantages inherent in the known types of drive-through now present in the prior art, the present invention provides a new bidirectional spring-biased gate wherein the same can be utilized for providing convenience for the user when seeking to enter or leave an animal enclosure without having to disembark from his or her vehicle to unlock and then re-secure the gate.

It is therefore an object of the present invention to provide a new and improved bidirectional spring-biased gate that has all of the advantages of the prior art and none of the disadvantages.

It is another object of the present invention to provide a bidirectional spring-biased gate that automatically lowers and returns to its resting position when a vehicle is driven thereover.

Another object of the present invention is to provide a bidirectional spring-biased gate that is adapted to support the weight of a vehicle, such as an ATV or UTV.

Yet another object of the present invention is to provide a bidirectional spring-biased gate that is adapted to allow individuals to either enter or exit the enclosure to which the present gate is affixed.

Yet another object of the present invention is to provide a bidirectional spring-biased gate that has a 180-degree range of motion.

Still yet another object of the present invention is to provide a bidirectional spring-biased gate that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
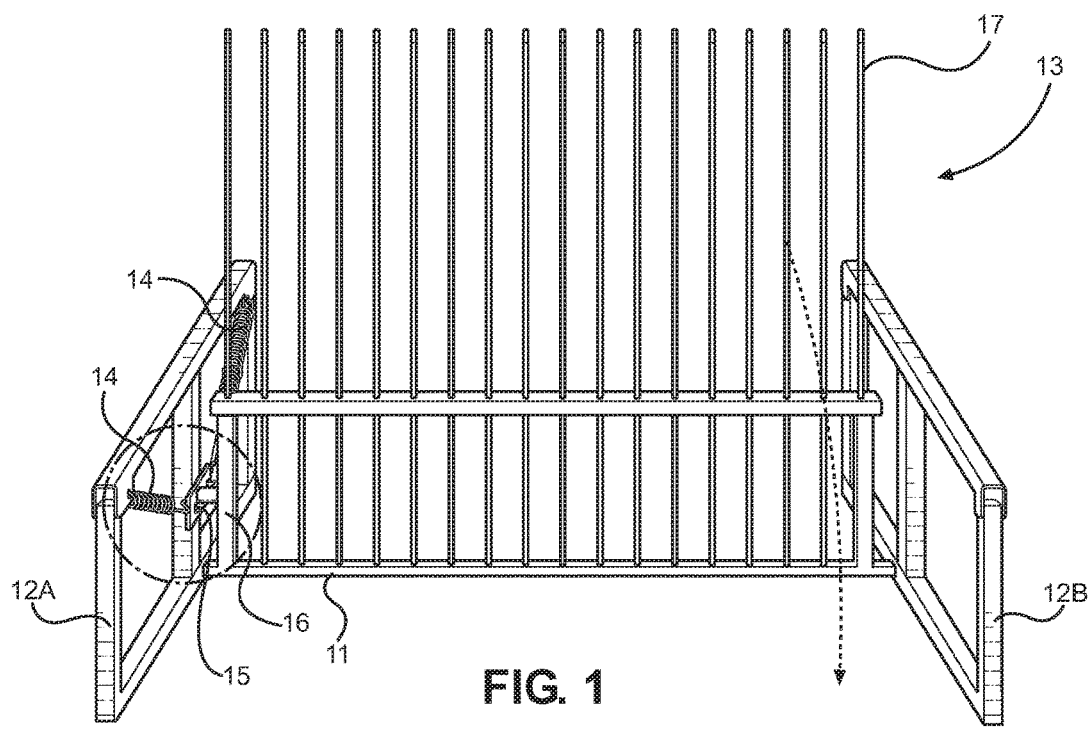
FIG. 1 shows a perspective view of the present invention.

Reference is made herein to the attached drawings. Like reference numerals are used throughout the drawings to depict like or similar elements of the bidirectional spring-biased gate. For the purposes of presenting a brief and clear description of the present invention, the preferred embodiment will be discussed as used as a drive-through gate for ATVs, UTVs, and other such vehicles for an animal enclosure. The figures are intended for representative purposes only and should not be considered to be limiting in any respect.

Referring now to FIG. 1, there is shown a perspective view of the present invention. The present invention comprises a first side frame 12A, a second side frame 12B, an elongated hinge 11 extending therebetween, and a gate 13 extending vertically from said hinge 11. In its resting position, the gate 13 extends vertically across the open interior between the first and second side frames 12A, 12B, providing a movable barrier suitable for deterring and/or blocking animals from passing therethrough. The hinge 11 provides a 180-degree range of motion for the gate 13, thereby allowing the gate to transition between its resting upstanding position, a first lowered position perpendicular to the resting position, and a second lowered position perpendicular to the resting position in the opposite direction of the first lowered position. The present invention further comprises a plurality of springs 14 extending between the side frames 12A, 12B and the gate 13, which are adapted to return the gate to its upstanding resting position from either the first lowered position or the second lowered position. The depicted embodiment of the present invention comprises a set of springs 14 extending between the second side frame 12B and the gate 13; however, the present disclosure contemplates embodiments of the present invention comprising springs 14 disposed on both the first and second side frames 12A, 12B, in addition to embodiments having springs 14 disposed on just one of said side frames 12A, 12B.

The outer first and second side frames 12A, 12B provide a wide support base for the present invention, stabilizing the gate 13 and preventing it from falling over during use. Furthermore, the first and second side frames 12A, 12B allow the present invention to be connected in series with a fence or other such structure. The first and second side frames 12A, 12B can be affixed to between opposing ends of a fence via fasteners, such as lag bolts. The members of the first and second side frames 12A, 12B are constructed from aluminum, steel, or other such materials that are durable and adapted to resist damage from animals, such as livestock. However, no claim is made as to a specific material of which the first and second side frames 12A, 12B are constructed.

In the depicted embodiment of the present invention, the gate 13 comprises a plurality of upstanding rods 17 arranged in series. In one embodiment of the present invention, the rods 17 are constructed from fiberglass. In another embodiment of the present invention, the rods 17 are constructed from fiberglass reinforced with an outer layer of nylon tubing. The base portion of the gate 13 is reinforced with an inner frame 16, which is adapted to support the rods 17 from the weight of vehicles, such as ATVs or UTVs, passing thereover. Furthermore, the inner frame 16 comprises a pair of attachment points 15 to which the springs 14 extending from the first and second side frames 12A, 12B are connected. When in a lowered position, the pair of springs 14 opposing the direction of the motion of the gate 13 are biased to pull on the inner frame 16 via the connection to the attachment points 15, which in turn returns the gate 13 to its upstanding position. As with the side frames 12A, 12B, the members of the inner frame 16 are constructed from aluminum, steel, or other such materials that are durable and adapted to resist damage from animals, such as livestock. The individual rods 17 are affixed to the hinge 11 via a cotter pin or other such fastener.

Figure 2:
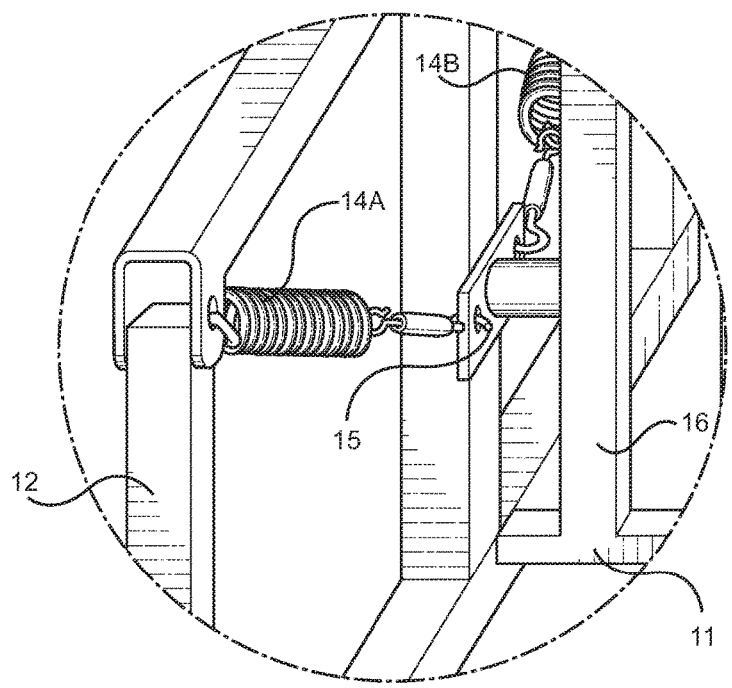
FIG. 2 shows a close-up view of the bidirectional spring-biased hinge mechanism of the present invention.

Referring now to FIG. 2, there is shown a close-up view of the bidirectional spring-biased hinge mechanism of the present invention. The present invention comprises a set of first springs 14A extending from one end of a side frame 12 to the gate 13 and a set of second springs 14B extending from the opposing end of a side frame 12 to the gate 13, which is situated at a generally medial position between the opposing ends of the gate 13. The springs 14A, 14B are arranged such that in either direction the gate 13 pivots, one of the sets of springs 14A, 14B will be stretched and thus the stretched spring 14A, 14B will return the gate 13 to its upstanding resting position when the force that caused the gate 13 to pivot, such as an ATV riding thereover, is removed. In the depicted embodiment of the present invention, the springs 14A, 14B comprise a turnbuckle and a master link chain; however, no claim is made as to the precise means by which the springs 14A, 14B are connected to either the side frames 12 or the gate 13.

Figure 3A:
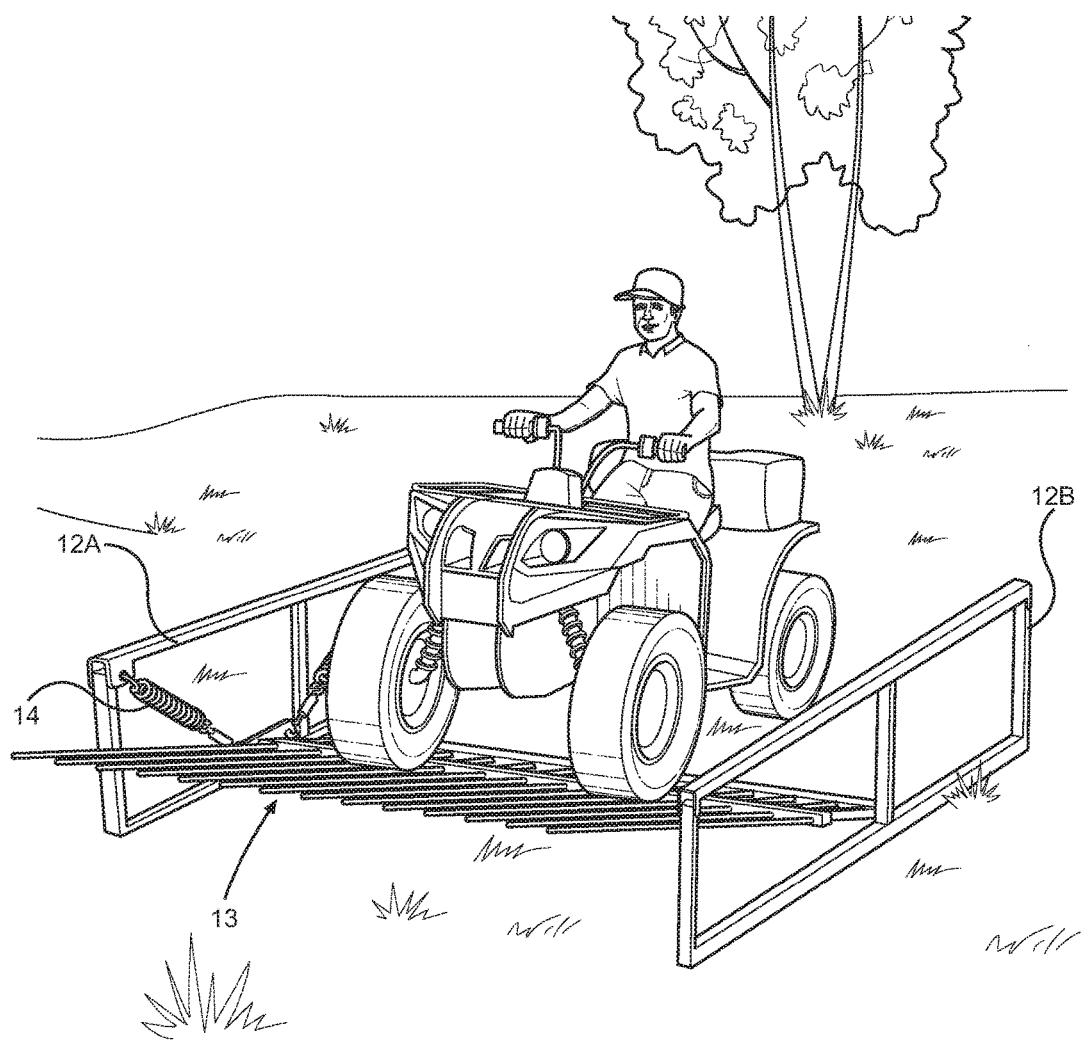
FIG. 3A shows a view of the present invention in use.
Figure 3B:
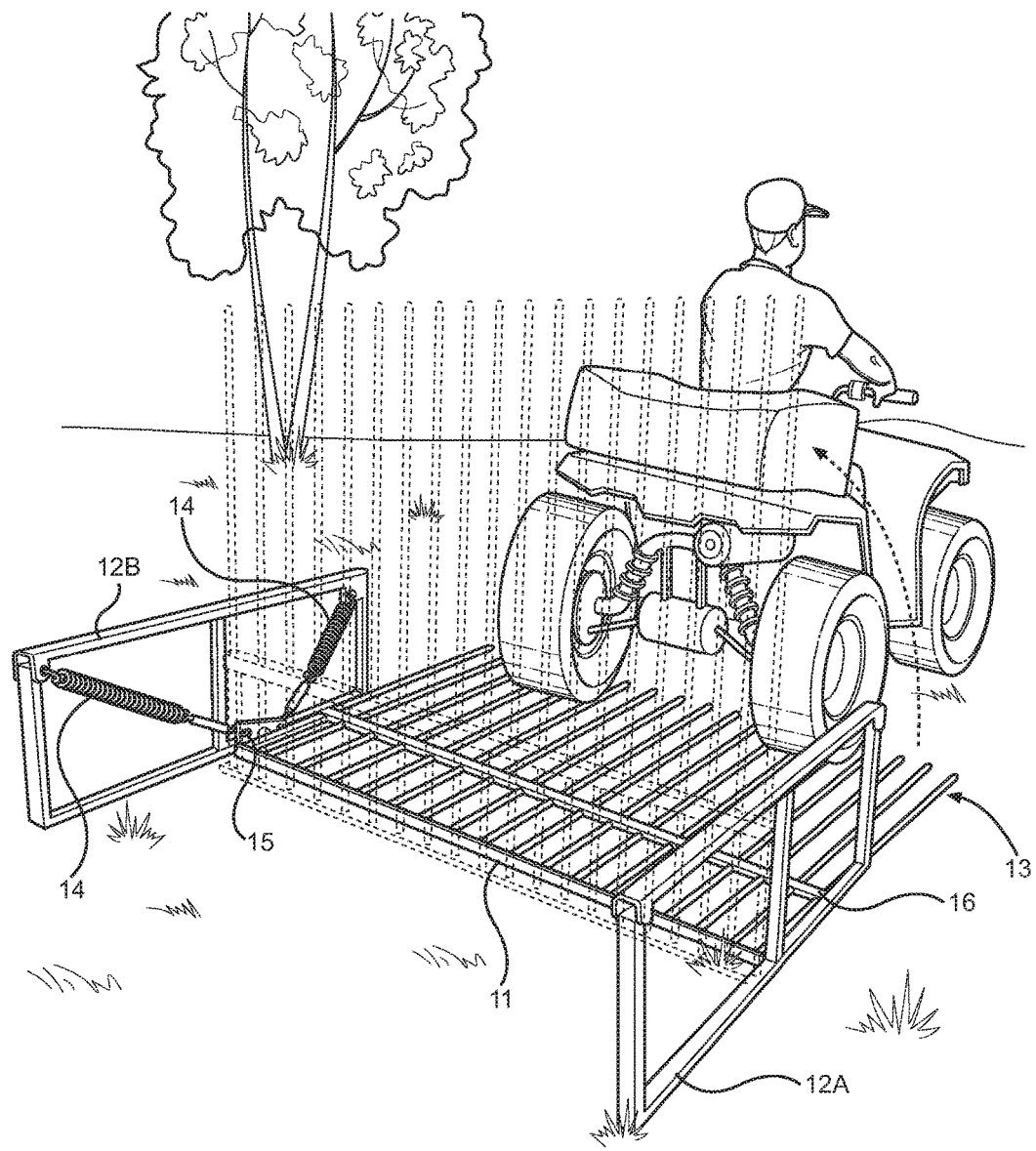
FIG. 3B shows a view of the present invention in use.

Referring now to FIGS. 3A and 3B, there are shown views of the present invention in use. The present invention is adapted to provide a bidirectional gate that can be passed via simply driving thereover on a vehicle, such as an ATV or UTV, without the need for the user to get off of the vehicle, open the gate, drive through, and then re-secure the gate. Furthermore, the present invention is adapted to automatically return to its upstanding position, providing a barrier to deter and/or prevent animals, such as livestock, from passing therethrough.

To make use of the present invention, the side frames 12A, 12B must be connected in series with opposing portions of a fence. The side frames 12A, 12B are attachable to the fence via lag bolts or other such fasteners. When the user wishes to traverse the gate 13 while driving an ATV or UTV, he or she simply must slowly approach the gate 13 with the vehicle, allow the front wheels of the vehicle to impinge upon the base of the gate 13, and then drive the vehicle forward, causing an increasing amount of the weight of the vehicle to rest upon the gate 13. As the vehicle moves forward, the weight of the vehicle counteracts the forces of the spring 14 opposing the movement and thereby pushes the gate 13 downward. The individual can then drive over the lowered gate 13. Once the individual has completely driven thereover and the weight of the vehicle is no longer restring on the gate 13, the springs 14 biased opposite of the direction of the rotation of the gate 13 return the gate 13 to its upstanding position. The present invention thereby provides a gate 13 that does not force a user to disembark from his or her vehicle in order to open the gate and that also automatically returns to an upstanding position.

In an alternative embodiment of the present invention, the gate 13, the inner frame 16, and the hinge 11 may be provided in two separate sections removably connectable together via bolts or other fasteners. This embodiment of the present invention is advantageous because it allows the present invention to be broken down to aid in storage and transport. Furthermore, the provided embodiment of the present invention is intended to be merely exemplary. Larger embodiments of the present invention adapted to accommodate tractors and other larger machinery are also contemplated by the present disclosure. Still further, the various embodiments of the present invention may comprise a locking mechanism for holding the gate fixed in place and preventing it from lowering.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gate assembly, comprising:
   a first side frame;
   a second side frame;
   a hinge extending between the first and second side frames;
   wherein the first side frame comprises two vertical members each having a proximal end and a distal end and comprises a horizontal member connecting the distal ends of the two vertical members to form first and second corners of the first side frame;
   a gate extending from said hinge, said gate adapted to pivot between an upstanding position, a first lowered position, and a second lowered position; wherein in the first lowered position, the gate extends from the hinge in a first direction and in the second lowered position, the gate extends from the hinge in a second direction opposite the first direction;

wherein the gate further comprises an inner frame, wherein a connecting element is mounted to the inner frame and a mounting plate is mounted to the connecting element, the mounting plate defines a first attachment point and a second attachment point, wherein a longitudinal axis of the connecting element extends parallel to and above an axis of the hinge;

a first spring having first and second ends, wherein the first end of the first spring is affixed to the horizontal member adjacent the first corner and the second end of the first spring is affixed to the first attachment point, the first spring biased to return the gate to the upstanding position from the first lowered position;

a second spring having first and second ends, wherein the first end of the second spring is affixed to the horizontal member adjacent the second corner and the second end of the second spring is affixed to the second attachment point, the second spring biased to return the gate to the upstanding position from the second lowered position;

wherein the first attachment point is disposed on a first side of a plane of the gate and the second attachment point is disposed on a second side of the plane of the gate;

wherein when the gate is in the first lowered position or the second lowered position a respective one of the first spring or the second spring is biased to pull on the inner frame via a respective one of the first attachment point or the second attachment point to return the gate to the upstanding position.

2. The gate assembly of claim 1, wherein said gate comprises rods composed of fiberglass.

3. The gate assembly of claim 1, wherein said gate comprises rods composed of fiberglass and reinforced nylon tubing.

4. The gate assembly of claim 1, wherein said hinge has a 180-degree range of motion.

5. The gate assembly of claim 1, wherein said first side frame and said second side frame are adapted to be attached to a fence.

6. The gate assembly of claim 1, wherein said first side frame and said second side frame are adapted to be attached to a fence via fasteners.

* * * * *